United States Patent
De La Rosa I Esteva et al.

(10) Patent No.: US 8,140,426 B2
(45) Date of Patent: Mar. 20, 2012

(54) AUCTION PROCEDURE FOR USE WITH A SPECIAL PURPOSE DIGITAL COMPUTER FOR AN EFFICIENT ACHIEVEMENT OF LIMITED RESOURCES IN A COMPETING ENVIRONMENT

(75) Inventors: Josep Lluis De La Rosa I Esteva, Girona (ES); Boleslaw K. Szymanski, Troy, NY (US)

(73) Assignee: Universitat de Girona (ES)

( * ) Notice: Subject to any disclaimer, the term of this patent is extended or adjusted under 35 U.S.C. 154(b) by 661 days.

(21) Appl. No.: 11/971,451

(22) Filed: Jan. 9, 2008

(65) Prior Publication Data
US 2010/0023439 A1 Jan. 28, 2010

(51) Int. Cl.
*G06Q 40/00* (2006.01)
(52) U.S. Cl. ............... 705/37; 705/36 R; 379/265.01
(58) Field of Classification Search .......... None
See application file for complete search history.

(56) References Cited

U.S. PATENT DOCUMENTS

| | | | | |
|---|---|---|---|---|
| 5,297,026 A * | 3/1994 | Hoffman | ........... | 705/14.18 |
| 5,787,404 A * | 7/1998 | Fernandez-Holmann | ...... | 705/35 |
| 6,018,718 A * | 1/2000 | Walker et al. | ........... | 705/14.17 |
| 6,088,682 A * | 7/2000 | Burke | ........... | 705/17 |
| 6,105,865 A * | 8/2000 | Hardesty | ........... | 235/380 |
| 6,112,191 A * | 8/2000 | Burke | ........... | 705/41 |
| 6,128,599 A * | 10/2000 | Walker et al. | ........... | 705/14.27 |
| 6,131,810 A * | 10/2000 | Weiss et al. | ........... | 235/379 |
| 6,164,533 A * | 12/2000 | Barton | ........... | 235/380 |
| 6,243,688 B1 * | 6/2001 | Kalina | ........... | 705/14.18 |
| 6,311,170 B1 * | 10/2001 | Embrey | ........... | 705/40 |
| 6,345,261 B1 * | 2/2002 | Feidelson et al. | ........... | 705/14.18 |
| 6,434,534 B1 * | 8/2002 | Walker et al. | ........... | 705/14.13 |
| 6,876,971 B1 * | 4/2005 | Burke | ........... | 705/14.1 |
| 6,941,279 B1 * | 9/2005 | Sullivan | ........... | 705/35 |
| 6,985,873 B2 * | 1/2006 | Sullivan | ........... | 705/14.25 |
| 7,072,851 B1 * | 7/2006 | Wilcox et al. | ........... | 705/14.34 |
| 7,086,586 B1 * | 8/2006 | Sullivan | ........... | 235/379 |
| 7,146,328 B1 * | 12/2006 | Solomon et al. | ........... | 705/14.34 |
| 7,360,693 B1 * | 4/2008 | Sullivan | ........... | 235/380 |
| 7,392,224 B1 * | 6/2008 | Bauer et al. | ........... | 705/41 |
| 7,676,034 B1 * | 3/2010 | Wu et al. | ........... | 379/265.01 |

(Continued)

FOREIGN PATENT DOCUMENTS

WO   WO 2005/001728   *   1/2005

OTHER PUBLICATIONS de Figueiredo, John M. Finding Sustainable Profitability in the E-commerce Continuum. Sloan School of Management, MIT E52-545. © Apr. 2000.*

(Continued)

*Primary Examiner* — Charles Kyle
*Assistant Examiner* — Robert Niquette
(74) *Attorney, Agent, or Firm* — Lowe Draham Jones PLLC

(57) ABSTRACT

An auction procedure intended to replace the known review process by an auction based approach is provided. The better a submitted work by an author, the more this author may bid to have it appear in some congresses or journals. If the assessment of quality represented by the bid is right, the author will be rewarded in some new sort of scientific currency, otherwise the author will suffer loses of the currency.

11 Claims, 3 Drawing Sheets

U.S. PATENT DOCUMENTS

| | | | | |
|---|---|---|---|---|
| 2004/0193539 A1* | 9/2004 | Sullivan | | 705/39 |
| 2004/0215505 A1* | 10/2004 | Sullivan | | 705/14 |
| 2005/0091144 A1* | 4/2005 | Longman et al. | | 705/37 |
| 2005/0251470 A1* | 11/2005 | Sullivan | | 705/35 |
| 2006/0111980 A1* | 5/2006 | Sullivan | | 705/14 |
| 2006/0206402 A1* | 9/2006 | Sullivan | | 705/35 |
| 2008/0154795 A1* | 6/2008 | Alon et al. | | 705/36 R |

OTHER PUBLICATIONS

C. Carrillo, J. L. de la Rosa, A. Moreno, E. Muntaner, S. Delfin and A. Canals, Social Currencies and Knowledge Currencies, Frontiers in Artificial Intelligence and Applications—AI Research & Development, IOS Press, 146 (1), 266-274, (2006).

J. L. de la Rosa, Outline of Citation Auctions, Frontiers in Artificial Intelligence and Applications—AI Research & Development, IOS Press, 146 (1), 299-307, (2006).

Terry Payne and Ester David and Nicholas R. Jennings and Matthew Sharifi, Auction Mechanisms for Efficient Advertisement Selection on Public Displays, The 17th European Conference on Artificial Intelligence (ECAI2006), pp. 54-60, Riva del Garda, Italy, (2006).

* cited by examiner

AUCTION PROCEDURE FOR USE WITH A SPECIAL PURPOSE DIGITAL COMPUTER FOR AN EFFICIENT ACHIEVEMENT OF LIMITED RESOURCES IN A COMPETING ENVIRONMENT

FIELD OF THE INVENTION

This invention refers to an auction procedure implemented with a special purpose digital computer that provides an effective tool for making decisions regarding distribution of limited resources to competing agents. The procedure is suitable for a scientific context during conference for presentation of a paper and its authors to improve the existing peer-review methods allowing converting a citation into a metrics of benefit of allocating space in proceedings and time.

The procedure of this invention can also be used in any general management application (business, private hospitals, cars dealers, in which a choice of one of many competing agents needs to be made to be allocated a contract, an operation, a lot of cars, etc).

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Classical or electronic journals and congresses in the following termed as CJ are increasing its use by an increasing offer from the scientific demand. Within these journals and congresses, the organizing committees typically utilize a variety of delivery methods to maximize the number of different papers displayed, and thus increase their overall exposure to target audiences. This trend is similar to marketing, where agents can work in (see [1]). However, the existing marketing methods are typically naïve and do not take into account the current audience.

Citation analysis, along with other measures, is used prominently to assess the quality of departments and universities around the world and is also employed to rank institutions and systems.

The sciences produce some 350,000 new, cited references weekly, while the social sciences generate only 50,000 and the humanities 15,000 such references. This means that universities with strength in the hard sciences are deemed more influential and are seen to have a greater impact—as are individuals who work in those fields. The biomedical fields are especially overrepresented because of the numbers of citations that they generate. All of this means that individuals and institutions in developing countries publishing in their native languages are at a significant disadvantage compared to others.

It is important to remember that the citation system was invented mainly to understand how scientific discoveries and innovations are communicated and how research functions. It was not, initially, seen as a tool for the evaluation of individual scientists or entire universities or academic systems. Hence, the citation system is useful for tracking how scientific ideas in certain disciplines are circulated among researchers at top universities in the industrialized countries, as well as how ideas and individual scientists use and communicate research findings. Yet, the system invented for quite limited functions is used to fulfill purposes for which it was not intended. Hiring authorities, promotion committees, and salary-review officials use citations as a central part of the evaluation process. This approach overemphasizes the work of scientists, those with access to publishing in the key journals and those with the resources to do cutting-edge research in an increasingly.

On the other hand, a number of online publications and new peer-review methods have been proposed to update the way that the scholar community works. As Sergey Brin and Larry Page (founders of Google) suggest in [2], "the scientists must learn marketing to better target their research to their potential users".

And talking about marketing, a number of interactive public displays have been proposed that support communication with a user through active use of handheld devices such as PDAs or phones, or to a closed set of known users with pre-defined interests and requirements (see [6]). Such systems assume prior knowledge about the target audience, and require either that a single user has exclusive access to the display, or that users carry specific tracking devices [3] [8] so that their presence can be identified. These approaches fail to work in public spaces, where no (or little) prior knowledge exists regarding users who may view the display, and where such displays need to react to the presence of several users simultaneously.

References [4], [5], [7] and [9] to [11] later detailed are considered also of interest to position the proposal of this invention into the field.

In contrast, the procedure of this invention provides an intelligent public peer-review and communication procedure that utilizes a novel approach to improve the selection of papers for display.

SUMMARY OF THE INVENTION

This invention proposal is intended to replace the referred review process by an auction based approach: the better the submitted work by an author, the more this author may bid to have it appear in some congresses or journals. If the assessment of quality represented by the bid is right, the author will be rewarded in some new sort of scientific currency, otherwise the author will suffer loses of this currency. The invention also argues that citations can be an appropriate worldwide accepted scientific currency.

The goal of the selection proposed by the procedure of this invention is to maximize the exposure of as many papers as possible to as wide an audience as possible (i.e. to maximize the number of distinct papers seen by the population of users) and therefore maximize the number of potential citations as a payback to the authors of the paper. In doing so, the main advantage of the proposed auction procedure is that it achieves this goal without: (i) any exhaustive prior knowledge on the audience, (ii) the need for any specific action by the user.

As no direct feedback is a priori received from the audience and the only knowledge available is based on the past observations of user presence, one of the key challenges of this auction procedure is to predict which paper is likely to gain the highest exposure during the next publishing cycle. To approximate this prediction, the procedure of this invention utilizes historic information of past users' exposure to certain sets of papers (so that avoiding to repeat material they have already seen), along with the information about what users are currently viewing on the CJ. In particular, a multi-agent auction-based mechanism was developed to efficiently select a paper for each CJ session or time/space slot. In the scenario devised by this auction procedure, each agent represents a scientist that wishes to publish or communicate, and it is provided with a bidding strategy that utilizes a heuristic to predict future publication exposure, based on the expected audience composition. The particular issue that makes this invention procedure interesting is a analogy of CJ and Marketing Media (TV, Newspapers, Radio, etc), when the CJ was a media of scientific diffusion consisting in a section of first-class prestigious and appealing papers and a second section of "adverts" of scientific works trying to get its place in the scientific community. The first section may be the selection of papers by means of peer-review or other conventional mechanisms, but in the second section another selection of papers might apply, namely auctions among other approaches.

The application of the present auction procedure is manyfold:

Scientific management: a substitute of the peer-review refereeing process (this example is in the embodiment disclosed fully developed);

FAQ management: a method to create complete FAQ;

SAC management: a method to create complete information in SAC by the citizens' participation; and any general management application (business, private hospitals, cars dealers, in which a choice of one of many competing agents needs to be made to be allocated a contract, an operation, an lot of cars, etc)

The following definitions will be used along the following description:

Agent: this is a physical person, scientist, surgeon, citizen, a juridical person or an artificial agent when they are authors of some work or potential executors of an action, such as fulfilling a contract, performing an operation, selling cars, etc.

PRoA: the predicted Return on Action refers to a predicted value of an action taken by the particular agent. For example, one can predict the expected number of citations that issuing a work will generate in some scientific communities, or the probability of successful surgery for a patient, or expected amount of money for selling a car lot, etc.

Contribution: this is some work, action or knowledge, to be executed, or already developed and authored by an agent.

Citation: is a public act where an agent refers to a contribution of other agent, normally because it claims it is useful, although any other property can be claimed by a citation. In fact it is a piece of knowledge: it tells that that referenced work is useful.

RoAC: the Return on Auctions in a based Currency. For example, a Citations Certificate can be the currency.

Wallet (W): is the amount of a given currency units that belongs to an agent in a given moment.

Bank of Wits (BoW) this is an institution in a given constrained Universe U to verify the RoA and preventing fraud.

Arena: this is the marketplace to perform the CM (auctions by default). In the example of citation auctions the arena replaces the peer-review process.

CM (Contributions Methods): This is any method to select contributions that use a given currency in an Arena.

CJ refers to classical or electronic journals and congresses.

PV: private value.

Thus, in order to develop the auction procedure of the invention following elements intervenes:

a number of agents $a_i$ each of them capable of providing some contribution to a subject K involving some work, action or knowledge to be executed or already developed and authored by one of said agents in an environment or Arena;

an authority that certificates a number of account units on a given currency assigned as a result of a contribution of any of said agents $a_i$; in said Arena;

a wallet $w_i$ containing an amount of currency that belongs to a an agent $a_i$ at a given moment.

Accordingly, the invention the method to be implemented with a special purpose digital computer comprises following steps:

each of the agents $a_i$ before providing a contribution to a given subject making a bid on a predicted return on action (PRoA) referring a predicted amount value of an action obtainable for a contribution given to a subject K in said environment or Arena;

said bid of said agent $a_i$ being based on a PRoA taking into account said wallet $w_i$ so that maximum amount of the bid is limited for the amount in the wallet;

for any of the agents $a_i$ entering into the Arena deduce the amount of the bid based on a PRoA from the corresponding initial wallet $w_i$;

performing a checking after at least a given period of time about the return value granted by said authority to a given contribution or (RoA) for any of the agents $a_i$ having entered into the Arena with a bid; and adjust the wallet $w_i$ of the agent $a_i$ in case the given contribution thereof has obtained a positive return value (RoA) over the PRoA used in the bid.

Therefore in case a particular agent did not obtain a positive result, a loss from the initial wallet corresponding to the amount involved in the bid occurs.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded for clarity. Included in the drawings are the following Figures.

DETAILED DESCRIPTION OF THE INVENTION

Described below is an exemplary embodiment of the present invention. The included embodiment illustrates one way in which the present invention can be implemented. Although the detailed embodiment refers to a contribution consisting in citations in a scientific environment the invention may be used for various other purposes as previously referred.

In more detail, and as previously referred, this auction procedure advances the state of the art by:

Deploying the Scholar Agent [12, 13] prototype architecture.

Developing a multi-agent auction-based marketplace for effectively marketing papers on the Scholar Agent prototype.

Devising a heuristic-based bidding strategy that can be used by the agents in the auction mechanism to improve the private value of Scholar Agents vs. the initial private value set up by scientists.

The auction procedure previously detailed comprises following steps:
Being
U={$a_i$} the universe of agents;
W={$w_i$} the wallets of all i agents in the universe U, measured in ¢ units;
$b_{i,k}$ a bid from an agent $a_i$ resulting from a PRoA of said agent $a_i$ with respect to a subject k; such that $b_{i,k}<w_i$;
$k_i$ the particular contribution of agent i with respect to k; and
$B_k$={$b_{i,k}$} the bids of all i agents with respect to k.
For every k that awaits the contributions and bids of the agents in a universe U
For every agent $a_f$=winner (Arena (CM, $B_k$)) with contribution $k_f$ and bid $b_{f,k}$ $w_{fin}:=w_f-b_{f,k}$;

$w_f\Delta t:=w_f+RoA(k_f)\Delta t$ $w_{fen}:=w_f+RoA(k_f)_\infty$

End For
wherein:
$w_{fin}$ is the initial wallet of agent $a_f$ after paying a bid based on a PRoA for k;
$w_f\Delta t$ is the wallet of agent $a_f$ after having been updated incrementally by $\Delta t$ intervals with the RoA($k_f$); and $$RoA(k)_\infty = \lim_{t\to\infty} RoA(k),$$

that is the verified RoA of a contribution k in the infinite time or at the end of a given period.

A given contribution method (CM) is used to select contributions that use said agreed currency in the Arena.

The proposed auction procedure is useful for a scientific management wherein said Arena is a scientific context and in that said PRoA is a citation or citations that issuing a work will generate in some scientific community, involving a public act where an agent refers to a contribution of another agent. In such a scientific context every agent $a_i$ is allowed to cite another agent, but not himself, and an external (different from authors cited or citing) authority is allowed to verify the number of citations. This external authority is ordinary said authority that certificates results.

In addition, according to the invention when an agent $a_i$ has no amount of the agreed currency at a given moment in a corresponding wallet $w_{fin}$ it is necessary to borrow an amount from another agent.

Figure 1:
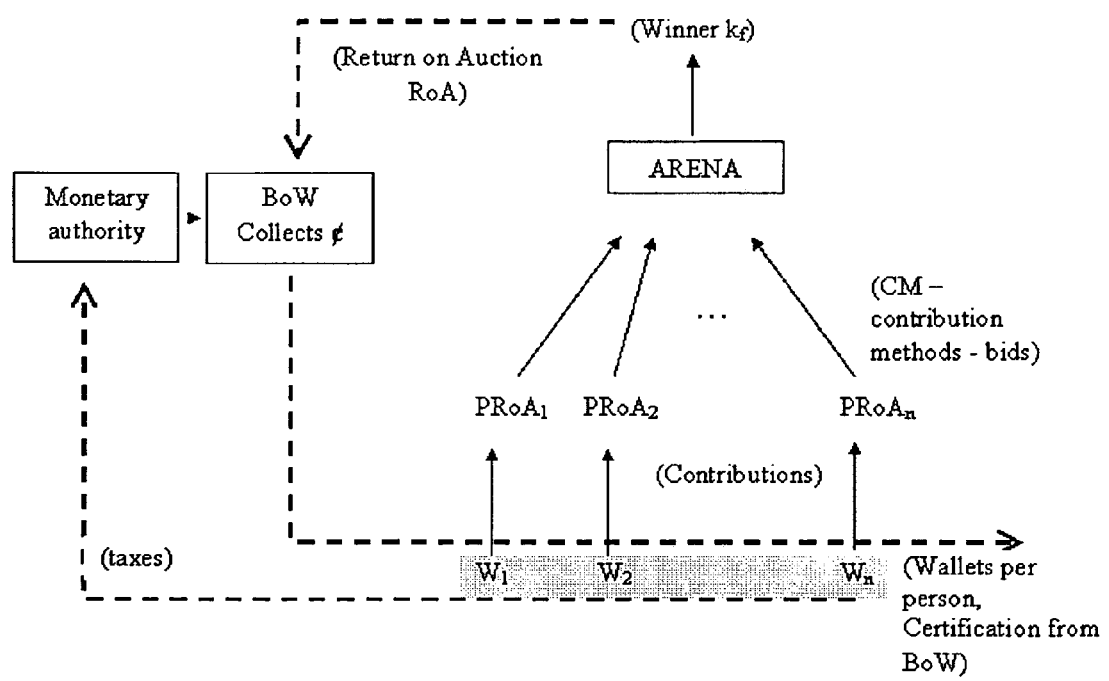
FIG. 1 is a diagram showing the elements involved in the procedure of this invention implemented in a Web-base market place (Arena) for executing auctions.

The schematic diagram of FIG. 1 allows understanding the elements involved in this auction procedure as well as the dynamic interaction (see the arrows) thereof.

The authority that certificates the results includes an entity or BoW acting as a Bank that periodically performs at least following tasks:
- it verifies the RoA and assigns them to agents (authors) to update their wallets wi;
- it prevents fraud in terms of fraudulent generation of currency; and
- it escrows transactions/agreements/loans among agents, etc, and keeps the related correspondence private.

An example of BoW could be the World Bank of Citations (WBC).

The referred authority is in addition a monetary authority (controlling among others the issue of currency) to manage the community of agents and to encourage interdisciplinary contributions.

As previously indicated said Arena can be a commercial environment where said agents $a_i$ provide a sale strategy. Following two examples in such a commercial environment will provide a better understanding of how the auction procedure previously detailed can be implemented into the corresponding field.

EXAMPLE A

A car dealer bids strongly for his fourth quarter sales and the manager finally decides to allocate him a new lot of cars delivered from the factory versus allocating them to another car dealer under his management. At the end of the fourth quarter, the manager see the sale reports and if the financial sale results are over dealer's bid, then the manager will provide certain payoff to the car dealer's wallet, otherwise the manager will subtract certain penalty from this wallet (decreasing the car dealer ability to bid for the next car shipment successfully). Hence, in the next quarter the car dealer's wallet will represent numerically his reputation status and the size of his wallet will decide if he will be able to successfully bid for the new cars against other dealers and for how many of them.

EXAMPLE B

A consultant moves from company to company accumulating not only amount of references (as well as experience) but also the amount of his/her wallet that measures how well his/her performance predictions measured up to real improvement that his/her advise brought. That is, company requests proposals (bids) for consulting contract in the form of the predictions what effect the consulting can make for the company. Then the company will balance what are the predicted results in the proposal were with the actual results and to the outcome would result either in credits or debits to the consultant's wallet. In the long run, the companies will be able to select a consultant based on the size of his/her bids and the strength of his wallet representing his solvency.

Evaluation of the Procedure

To evaluate the bidding strategy described in the auction procedure of this invention on within a controlled environment, a simulation was developed. This is based on the same architecture as the deployed Scholar Agent instance, but it additionally supports the modeling of users in the audience.

The former experiment performed was about the maximization of the exposure by means of guessing the public in CJ sessions. In these experiments we examine the global behavior regarding 5 types of PV as initial value v0(aj) of each scholar agent aj regarding a common auction strategy for all them. They are:

Optimistic: the PV of the scientist si regarding a paper p is higher than the consensus private value (CPV) that a group of peers would rate it after a peer-review process. In notation PV(si, p)$\geq$CPV (p)
Pessimistic: PV(si, p)$\leq$CPV (p)
Random: PV(si, p) is assigned without any relation to CPV (p)
Precise: PV(si, p)=CPV (p)
Precise but optimist: PV(si, p)$\approx$CPV (p)+$\epsilon$, being $\epsilon$ small compared to CPV (p)

Then every scholar agent on behalf of a scientist si is assigned the v0(aj)=PV(si, p)

Figure 2:
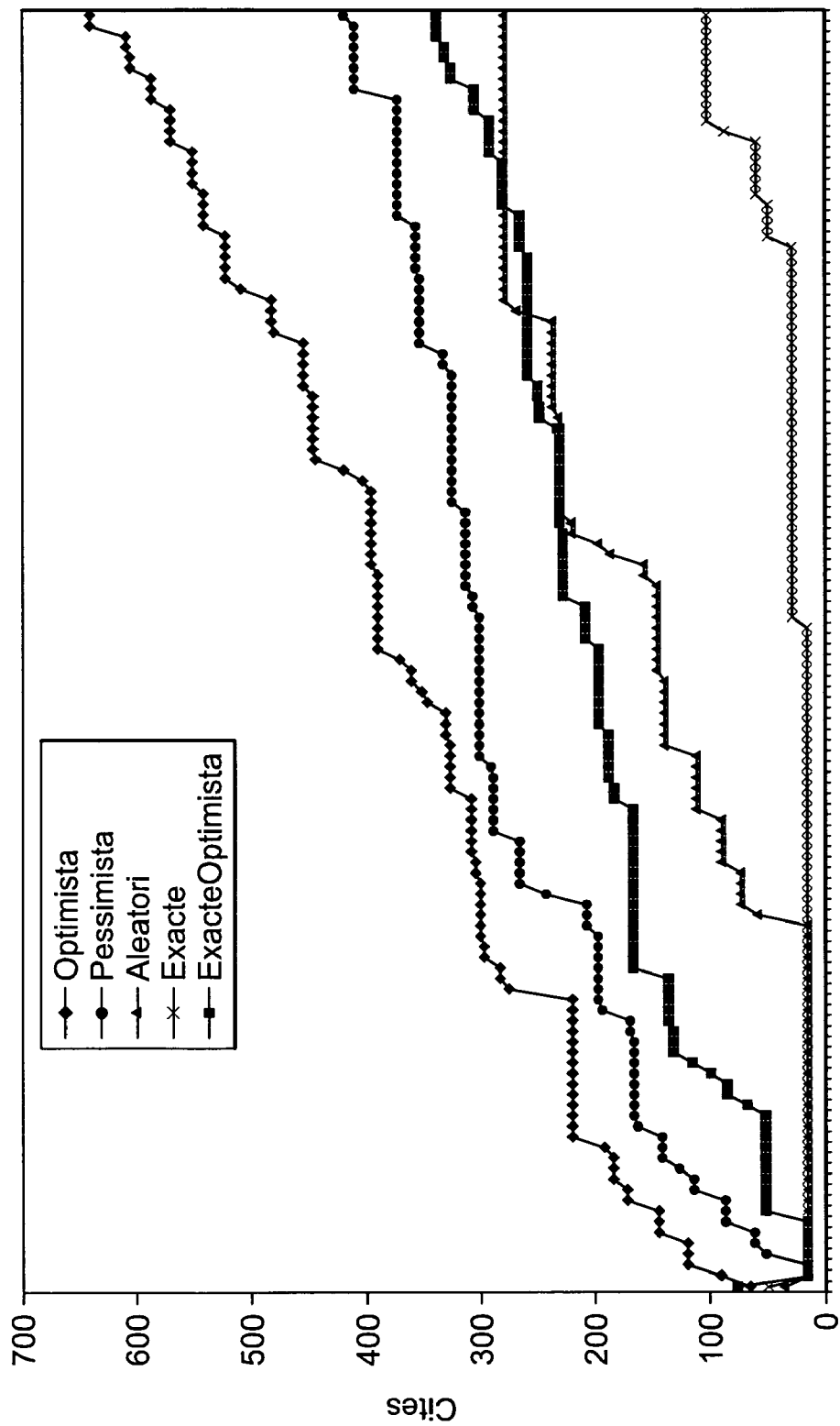
FIG. 2 and FIG. 3 are two graphics showing two experimental results from two corresponding empirical evaluations of the bidding strategy of the auction procedure of this invention.

The results (FIG. 2) after 100 auctions simulation in this environment show how the optimist agent is doing better than pessimist, rather much better that the precise agent, but the pessimist agent performs better than the precise but optimist agent. Random agent performs only better than precise agent. This is a surprising result, but it has a sense: the PV is estimated to create a bid, but the strategy for bids need to be improved, more sophisticated.

However, there is lack of further PV estimation in terms of what CJ quality and what are the public attending the CJ sessions so that the PV of every scholar agents is different from the initial PV of the scientist, and this is solved in the following experiments.

In a second experiment the Scholar Agent simulation modeled CJ behavior in terms of their likelihood of arriving at, and subsequently remaining at, a Scholar Agent session given the currently presented invention. The attending scientists (public) model was defined with the following assumptions:

- The session presence of scientist is measured in discrete sample-intervals
- The duration of the communication of a paper is assumed to be equal to a whole number of sample-intervals;
- A paper is considered as paper fully presentation to a scientist only when a scientist has been present for the whole duration of the paper presentation session;
- Scientists (public) can arrive at any point during an publishing cycle, whereby the probability that a researcher will arrive is Parrive;
- The probability a scientist may leave without observing the subsequent paper is Pdepart. A scientist will automatically leave if it has fully seen the subsequent paper;
- Both Pdepart and Parrive assume a uniform distribution.

Two alternate selection methods were compared with the auction: Round-Robin selection and Random selection. The former is a familiar mechanism used to repeatedly cycle through a number of papers (in order). Given our scientist model, this approach represents the optimal selection mechanism when Pdepart=0 and Parrive=1. The latter mechanism randomly selects a new paper to display at the beginning of each new publishing cycle, independently of what has been previously selected. This method was selected as a baseline against which the other worst-case methods can be compared.

To simplify this analysis, each experiment consisted of ten papers of equal duration (i.e. six samples which is equivalent to a 15 minute communication), represented by ten scholar agents. In each experiment, papers are selected and presented until every scientist has fully seen all ten papers. To ensure statistical stability, the results of each experiment are averaged over 10,000 test runs, and the mean results are reported. Where necessary, a Student's t-test is used to contra statistical noteworthiness at the 95% trust level.

Figure 3:
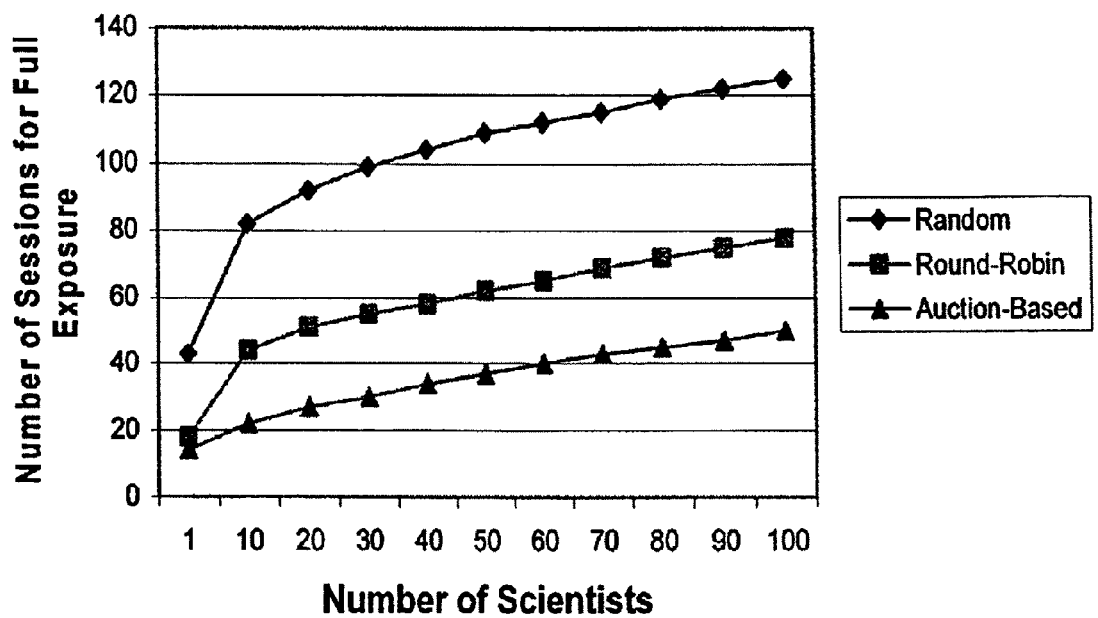

The behavior of each selection mechanism was examined as the number of scientist's present increases (FIG. 3). The number of scientists, Nd, was varied between 1 and 100, and the scientist behavior was defined using Pdepart=0.05 and Parrive=0.5. The plots supports the hypothesis that paper selection using the Scholar Agent auction is statistically more significant than either Round-Robin or Random (assuming the modeling parameters defined above). Specifically, as Nd increases, there is a corresponding exponential rise in the number of required communications. The mean number of communications required by the Scholar Agent auction is lower than the Round-Robin selection mechanism or the Random selection mechanism for all numbers of scientists tested; e.g. for Nd=50, the auction method required a mean of 43.52±0.16 publishing cycles to communicate all 10 papers to all the scientists, compared to Round-Robin (65.96±0.19) or Random (107.10±0.38). This suggests that although each selection method will scale, a single scientist will be exposed to all the papers in typically 34% fewer publishing cycles (communications) than the round robin approach.

References previously cited during the description are detailed below.

REFERENCES

[1] Sander M. Bohte, Enrico Gerding, and Han La Poutre, Market-based recommendation: Agents that compete for consumer attention, ACM Trans. on Internet Tech., 4(4), 420-448, (2004).

[2] David A. Vise, The Google Story, Pan Mac Millan Ed., (2005)

[3] Jeffrey Hightower and Gaetano Borriella, Location systems for ubiquitous computing, IEEE Computer, 34(8), 57-66, (2001).

[4] Brendan Kitts and Benjamin Leblanc, Optimal bidding on keyword auctions, Electronic Market, 14(3), 186-201, (2004).

[5] Vijay Krishna, Auction Theory, Academic Press, (2002).

[6] Joseph F. McCarthy, Tony J. Costa, and Edy S. Liongosari, Unicast, outcast & groupcast: Three steps toward ubiquitous, peripheral displays, in UbiComp '01: Proc. 3rd Int. Conf. on Ubiquitous Computing, pp. 332-345, London, UK, (2001). Springer-Verlag.

[7] W. Vickrey, Counterspeculation, Auctions and Competitive Sealed Tenders, Journal of Finance, 8-37, (1961).

[8] Roy Want, Andy Hopper, Veronica Falcao, and Jonathan Gibbons, The active badge location system, ACM Trans. on Information Systems, 10(1), 91-102, (1992).

[9] C. Carrillo, J. L. de la Rosa, A. Moreno, E. Muntaner, S. Delfin and A. Canals, Social Currencies and Knowledge Currencies, Frontiers in Artificial Intelligence and Applications—AI Research & Development, IOS Press, 146 (1), 266-274, (2006)

[10] J. L. de la Rosa, Outline of Citation Auctions, Frontiers in Artificial Intelligence and Applications—AI Research & Development, IOS Press, 146 (1), 299-307, (2006)

[11] Terry Payne and Ester David and Nicholas R. Jennings and Matthew Sharifi, Auction Mechanisms for Efficient Advertisement Selection on Public Displays, The 17th European Conference on Artificial Intelligence (ECAI2006), pp: 54-60, Riva del Garda, Italy, (2006)

[12] Gediminas Adomavicius, Member, IEEE, and Alexander Tuzhilin "Toward the Next Generation of Recommender Systems: A Survey of the State-of-the-Art and Possible Extensions, IEEE Transactions on Knowledge and Data Engineering, Vol. 17, no. 6, June 2005

[13] Montaner M.; López B; de la Rosa J. Ll, A Taxonomy of Recommender Agents on the Internet, ISSN 0269-2821, Artificial Intelligence Review, Vol: 19, pp: 285-330, Kluwer Academic Publishers, Berlin, 2003

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. An auction procedure for use with a special purpose digital computer for an efficient achievement of limited resources in a competing environment, including: a number of agents $a_i$ each of them capable of providing some contribution to a subject K involving some work, action or knowledge to be executed or already developed and authored by one of said agents in an environment or Arena; an authority that certificates a number of account units on a given currency assigned as a result of a contribution of any of said agents $a_i$; in said Arena; a wallet $w_i$ containing an amount of currency that belongs to a an agent $a_i$ at a given moment;

the method comprising:

providing a special purpose digital computer and operationally associating said Arena, said subject, wallets of said agents and said accounting units with said computer;

each of the agents $a_i$ before providing a contribution to a given subject making a bid in association with said computer on a predicted return on action (PRoA) referring, a predicted amount value of an action obtainable for a contribution given to a subject K in said environment or Arena;

said bid of said agent $a_i$ being based on a PRoA said wallet $w_i$ so that maximum amount of the bid is limited for the amount in the wallet;

for any of the agents $a_i$ entering into the Arena deduce the amount of the bid based on a PRoA from the corresponding initial wallet $w_i$;

performing in association with said computer a check after at least a given period of time about the return value granted by said authority to a given contribution or (RoA) for any of the agents $a_i$ having entered into the Arena with a bid; and adjusting in association with the computer the wallet $w_i$ of the agent $a_i$ in case the given contribution thereof has obtained a positive return value (RoA) over the PRoA used in the bid.

2. The auction procedure according to claim 1, further comprises: where:

$U=\{a_i\}$ the universe of agents;

$W=\{w_i\}$ the wallets of all i agents in the universe U, measured in units;

$b_{i,k}$ a bid from an agent $a_i$ resulting from a PRoA of said agent $a_i$ with respect to a subject k; such that $b_{i,k}<w_i$;

$k_i$ the particular contribution of agent i with respect to k; and and $B_k=\{b_{i,k}\}$ the bids of all i agents with respect to k;

for every k that awaits the contributions and bids of the agents in a universe U;

for every agent $a_f$=winner (Arena (CM, $B_k$)) with contribution $k_f$, and bid $b_{f,k}$;

$w_{fin}:=w_f-b_{f,k}$;

$w_f\Delta t:=w_f+RoA(k_f)\Delta t$ $w_{fen}:=w_f+RoA(k_f)\alpha$ wherein:

$w_{fin}$ is the initial wallet of agent $a_f$ after paying a bid based on a PRoA for k;

$w_f\alpha t$ is the wallet of agent $a_f$ after having been updated incrementally by $\Delta t$ intervals with the RoA($k_f$); and $$RoA(k)_\infty = \lim_{t\to\infty} RoA(k),$$

i.e, the verified RoA of a contribution k in the infinite time or at the end of a given period.

3. The auction procedure according to claim 2, wherein when an agent has no amount at a given moment in a corresponding wallet it is necessary to borrow an amount from another agent.

4. The auction procedure according to claim 2, wherein said authority that certifies results includes an entity acting as a Bank that periodically performs the following:

verifying the RoA and assigns them to agents (authors) to update their wallets $w_i$;

preventing fraud in terms of fraudulent generation of currency; and escrowing transactions/agreements/loans among agents, etc, and keeping the related correspondence private.

5. The auction procedure according to claim 4, wherein said authority is in addition a monetary authority to manage the community of agents and to encourage interdisciplinary contributions.

6. The auction procedure according to claim 2, wherein a contribution method (CM) is used to select contributions that use a given currency in said Arena.

7. The auction procedure according to claim 2, used for a scientific management wherein said Arena is a scientific context and in that said PRoA is a citation or citations that issuing a work will generate in some scientific community, involving a public act where an agent refers to a contribution of another agent.

8. The auction procedure according to claim 6, wherein every agent $a_i$ is allowed to cite another agent, but not himself, and an external (different from authors cited or citing) authority is allowed to verify the number of citations.

9. The auction procedure according to claim 8, wherein said external authority is said authority that certificates results.

10. The auction procedure according to claim 2, wherein said Arena is a commercial environment where said agents $a_i$ provide a sale strategy.

11. The auction procedure according to claim 1, wherein when an agent has no amount at a given moment in a corresponding wallet it is necessary to borrow an amount from another agent.

* * * * *